US000001085H

United States Statutory Invention Registration [19]

[11] Reg. Number: H1085

Simmons et al. [43] Published: Aug. 4, 1992

[54] SULFUR COATING OF UREA CONTAINING GELLING CLAYS

[75] Inventors: Charles L. Simmons, Tuscumbia; Reginald D. Cole, Muscle Shoals, both of Ala.

[73] Assignee: Tennessee Valley Authority, Muscle Shoals, Ala.

[21] Appl. No.: 264,116

[22] Filed: Oct. 28, 1988

[51] Int. Cl.[5] ..... C05C 9/00

[52] U.S. Cl. ..... 71/28

[58] Field of Search ..... 71/27, 28, 64.07, 64.12, 71/64.13, 903, 904

[56] References Cited

U.S. PATENT DOCUMENTS 4,676,821 6/1987 Gullett et al. ..... 71/64.12 X 4,885,021 12/1989 Elrod ..... 71/64.12 X

*Primary Examiner*—Richard D. Lovering

*Assistant Examiner*—Joseph D. Anthony

*Attorney, Agent, or Firm*—Robert A. Petrusek

[57] ABSTRACT

The present invention teaches a technique and provides for apparatus eminently useful for reducing the amount of sulfur currently needed by industry to sulfur coat water-soluble fertilizer materials such as, for example, granular or prilled urea. A further advantage of and benefit derived from the practice of the instant invention relates to the production of sulfur-coated urea products which have substantially higher nitrogen values than do urea products produced by prior art processes.

19 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Dissolution Rate vs. Total Coating

Dissolution Rate vs. Total Coating

SULFUR COATING OF UREA CONTAINING GELLING CLAYS

The invention herein described may be manufactured and used by and for the Government for governmental purposes without the payment to us of any royalty therefor.

INTRODUCTION

The present invention relates to new, novel, relatively simple and inexpensive as well as highly economically attractive improvements in the area of producing and utilizing certain types of particulate fertilizer material whereupon to the surfaces of the individual particles thereof an improved resulting coating of sulfur is applied.

The application of coatings of sulfur to normally water-soluble fertilizer pellets, such as for example, granular or prilled urea, is practiced by many artisans in the fertilizer industry to provide for the control of the dissolution rate of the nutrient values of the resulting fertilizer after application of same to the intended soil environment as, for example, in the instance of the subsequent distribution of such materials to the field. As disclosed in the teachings of U.S. Pat. No. 3,295,950, Blouin et al., Jan. 3, 1967, assigned to the assignee of the present invention, the benefits of such controlled dissolution rate are manyfold and include decreased loss of nutrient values by the action of percolating irrigation or rain water and coincident soil leaching, lower seedling and sprout damage, minimization of luxury consumption by the plant, and decreased nutrient loss normally resulting from decomposition of certain types of fertilizer materials to the gaseous phase. This latter benefit refers mainly to the nitrogen losses normally associated with the decomposition of urea after it is either surface applied or incorporated into a dry soil environment. Additional benefits derived from the practice of sulfur-coating fertilizer include such considerations as follows: At least a portion of the sulfur is available for plant nutrition, and prolonged release of nitrogen, a major nutrient therein, eliminates the need for repeated applications of fertilizer, especially those including the principal plant nutrient nitrogen later in the growing season. Sulfur coating of urea has thusly become a current standard commercial practice in the art of effecting the production of controlled-release nitrogen fertilizer.

BACKGROUND OF THE INVENTION

1. Field of the Invention

The present invention relates to improved methods and means for effecting the production of sulfur-coated urea, and includes substantial improvements therein whereby substantially less sulfur needs to be utilized in the coating thereof than is taught to be utilized in the many processes disclosed in the prior art and yet there is achieved in the practice of the instant invention the same desirable low dissolution rate of the resulting urea as is achieved in the practice of even the best presently available art. It will be appreciated by those skilled in the art that the method of the present invention thusly results in significant cost benefits in the commercial production of sulfur-coated urea. It will also become readily apparent to those skilled in the art that still another benefit derived by the practice of the instant invention is that the resulting coated products contain substantially less sulfur for a given dissolution rate and thereby result in economically more attractive materials having higher nitrogen contents. Conversely, if desired, levels of sulfur coating now practiced by industry may be used in the practice of the instant invention to thereby yield sulfur-coated urea products demonstrating dissolution rates vastly lower than those that can be achieved by such presently best available art.

A principal consideration relating to the practice of the instant invention is the selection and use of methods and/or means wherein the modus operandi comprises the use of, as substrate material, granular or prilled urea that has been previously conditions with gelling clays generally known in the art as channelized 2:1 clay minerals and including attapulgite and sepiolite, as disclosed in the teaching of U.S. patent application Ser. No. 158,810, Elrod, filed Feb. 22, 1988.

2. Description of the Prior Art

At the present time, because of the state-of-the-art developed in view of and in response to certain considerations supra, there are available a number of methods and means which utilize in one way or another a plethora of approaches for applying coatings of sulfur to urea for the purpose of achieving controlled dissolution rates in the resulting product. It is generally agreed that at least one of the earliest and most economically attractive, as well as technologically sound, of these was that originally revealed by Blouin et al. in the parent application, now abandoned, of U.S. Pat. No. 3,295,950, Blouin et al., Jan. 3, 1967, assigned to the assignee of the present invention. Subsequently, certain improvements in his methods were developed and reported in U.S. Pat. No. 3,342,577, Blouin et al., Sep. 19, 1967, also assigned to the assignee of the present invention. More recently, U.S. Pat. No. 4,587,358, Blouin, May 6, 1986, assigned to the assignee of the present invention, has taught that the use of, in combination with urea, calcium lignosulfonate (or other metal or ammonium lignosulfonates), homogeneously incorporated therewith and therein, as a vastly improved conditioning material for imparting to the resulting urea both superior anticaking and nonfriable characteristics. Still more recently, in U.S. Pat. No. 4,676,821, Gullett et al., Jun. 30, 1987, also assigned to the assignee of the present invention, has taught the use of calcium lignosulfonate (or other metal or ammonium lignosulfonates) homogeneously incorporated with urea as a superior substrate for coating with sulfur, thereby resulting in the production of products having dissolution rates substantially lower than urea conditioned in the conventional manner with formaldehyde.

It is verily believed that to those skilled in this art, who study the disclosure of the present invention, it will be appreciated that the practice of same overcomes a great multiplicity of the limitations and disadvantages of the various methods and/or means of the type presently found in the prior art and that the present invention results in a new, novel, and unique combination of certain selected features of the advances in the art set forth by Blouin supra, albeit with wholly unexpected results. Accordingly, for purposes of teaching, disclosing, and claiming the instant invention, the teachings and disclosures of U.S. Pat. Nos. 3,295,950, 3,342,577, 4,587,358, and 4,676,821 supra are herewith and hereby incorporated herein by means of reference thereto. Also, for purposes of incorporation into the disclosure of the present invention teachings relating to a standard testing procedure to determine the 7-day dissolution rate, reference is hereby made to the general description of the dissolution rate procedure contained in U.S. Pat.

No. 3,903,333, Shirley et al., Sep. 2, 1975, assigned to assignee of the present invention.

SUMMARY OF THE INVENTION

It has been noted that numerous prior art investigations have discovered, taught, and disclosed methods and/or means which utilize in one way or another a number of approaches for applying coatings to various fertilizer materials in general and coating of sulfur to urea in particular, for purposes of achieving controlled dissolution rates in the resulting product. More specifically, Blouin in '358 supra, has found that and taught the use of, in combination with urea, calcium lignosulfonate (or other metal or ammonium lignosulfonates), homogeneously incorporated therewith and therein, as a vastly improved conditioning material for imparting to the resulting urea particles both superior anticaking and nonfriable characteristics. The instant invention relates to an improved technique, including methods and means, and is based at least in part on our discovery that quite unexpectedly, urea containing channelized 2:1 clay minerals as in the manner of Gullett et al. in '821 supra, in addition to exhibiting the vastly improved and superior properties attributal thereto by Gullett et al., also exhibits very substantially reduced dissolution rates when subsequently coated with sulfur. The gist underlying the concept comprising the principal embodiment of the instant invention is that the process of incorporation of channelized 2:1 clay minerals in urea, in a manner analogous to the incorporation of lignosulfonates in urea, as '821 supra, also quite unexpectedly results in the production of a substantially superior substrate for subsequent sulfur coating than does urea conditioned in the conventional manner with formaldehyde.

OBJECTS OF THE INVENTION

It is therefore a principal object of the present invention to provide new methods and/or means eminently suitable for producing sulfur-coated urea such that substantially smaller amounts of sulfur (about two-thirds) is required to achieve similar substrate dissolution rates as compared to those achieved with presently available state of the art processes.

Another principal object of the present invention is to provide new methods and/or means eminently suitable for producing sulfur-coated urea such that substantially smaller amounts of sulfur (about two-thirds) is required to achieve presently commercially practiced substrate dissolution rates of about 25 percent in 7 days.

Still another principal object of the present invention is to provide new methods and/or means eminently suitable for producing sulfur-coated urea such that present commercially produced-practiced levels of sulfur-coating weight may be utilized thereon to produce products exhibiting substantially lower dissolution rates, e.g., as low as about 10 percent in 7 days.

A still further principal object of the present invention is to provide new methods and/or means eminently suitable for producing sulfur-coated urea, such that present commercially-practiced levels of sulfur-coating weight may be utilized thereon to produce products exhibiting substantially lower dissolution rates, e.g., about 10 percent in 7 days, and further exhibit the most desirable characteristic that such products can be subjected to considerably more mechanical handling, which tends to damage the sulfur shell thereon, than can be products produced by prior-art processes, without resultant degradation of the dissolution rate thereof above about 25 percent in 7 days.

Still further and more general objects and advantages of the present invention will appear from the more detailed description set forth below, it being understood, however, that this more detailed description is given by way of illustration and explanation only, and not necessarily by way of limitation since various changes therein may be made by those skilled in the art without departing from the true spirit and scope of the present invention.

BRIEF DESCRIPTION OF THE DRAWINGS

The present invention will be better understood from a consideration of the following description taken in connection with the accompanying drawings in which.

DETAILED DESCRIPTION OF THE DRAWINGS

Referring first and now more specifically to FIG. 2, for the sake of clarity and a better understanding of the applicability of the graphical illustrations therein, a more detailed description of same is given below in combination with the description of Example II.

Figure 1:
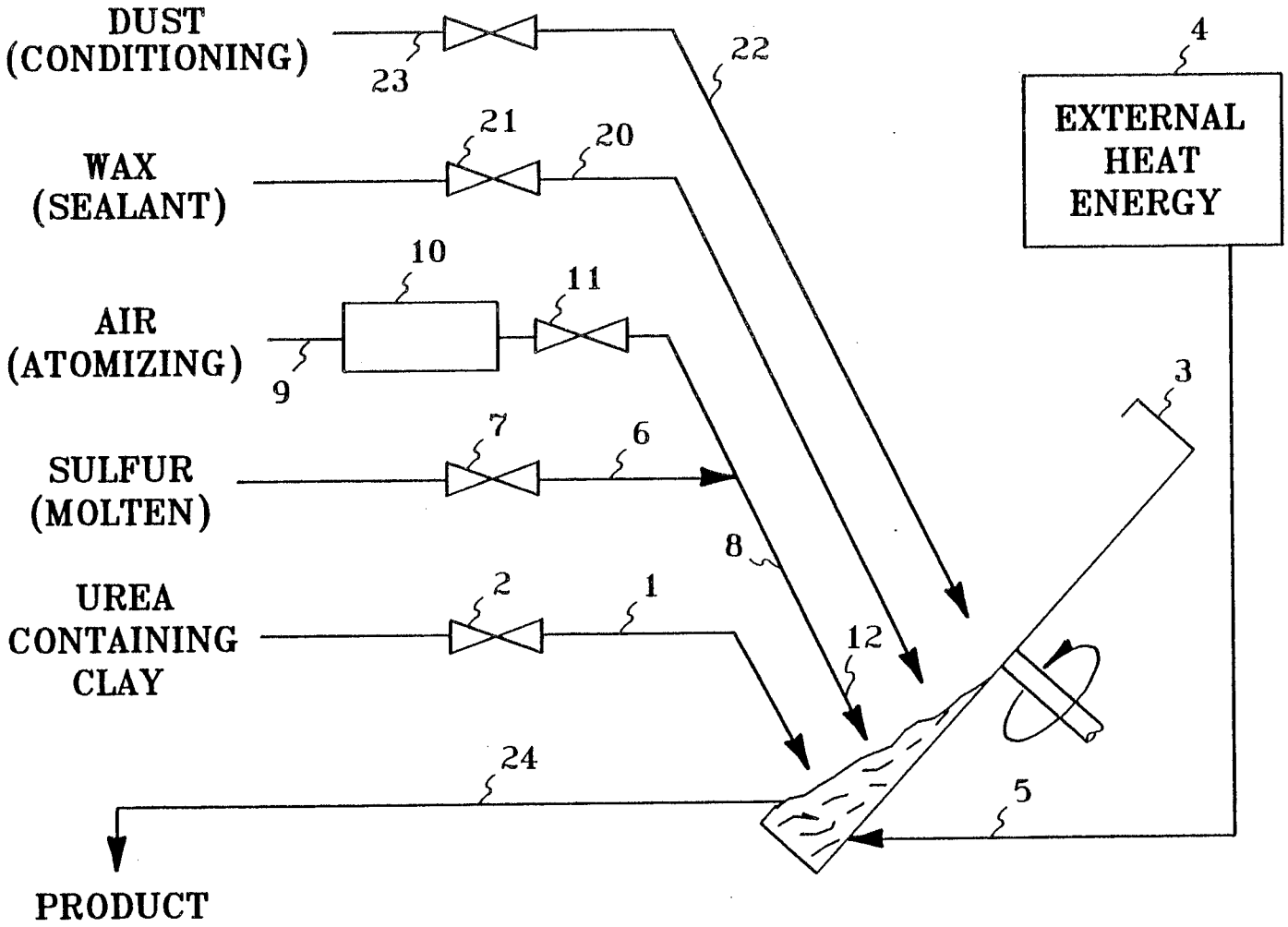
FIG. 1 represents a flowsheet illustrating the preferred embodiment of the present invention and generally depicts methods and means utilized in the effecting thereof.

Referring now more specifically to FIG. 1, therein is shown in schematic form the general layout of the practice of various embodiments of the instant invention including the concepts of both the batch process procedure that we used in testing of the instant invention and the continuous process which would be the preferred embodiment of said invention. Reference is now made specifically to the batch tests used in discovering concepts underlying the gist of the instant invention wherein the operation was carried out utilizing, as the coating device, a granulator of the pan-type with lifting flights. Urea granules containing channelized 2:1 clay mineral from a source not shown is charged into rotating inclined pan granulating and/or coating means 3. As described infra, operation of the initial embodiment of the instant invention was conducted on a batch basis. As described in other portions of this disclosure, operation of the instant process requires the application of external heat energy applied to the pan-granulator coating device. Accordingly, external heat energy from source 4 is directed via line 5 to pan granulating/coating means 3, it being understood, of course, that line 5 can represent any number of methods and or means of applying same through convection, conduction, and/or radiation, and granulating means 3 also is used herein as a synonym for coating means since granulating means 3 also doubles as cooling means 3. As depicted, the particulate material in pan granulating means 3 is substantially disposed about the tilted planar surface of the pan by action of the lifting flights and gravitational force. Concurrently, or subsequently, molten sulfur from a source not shown is fed via line 6 and means of control of flow 7 to line 8 wherein it is joined with air from a source not shown fed via line 9 through air heater means 10 and means for control of flow 11 and introduced into pan granulating means 3. The molten sulfur along with heated atomizing air in line 8 is normally sprayed onto the tumbling bed of particulate material maintained in pan granulating means 3 through introduction of same into pneumatic atomizing means 12 which means can be, for example, one or more pneumatic nozzles. In the usual operation of an inclined rotating pan granulator such as granulating means 3, the modus operandi is to arrange for introduction of the materials thereinto generally into an area through which most of the particulates are tumbling and accordingly as depicted the molten sulfur is directed to the general area of the pan planar surface. In operation of the instant invention in the batch mode, after introduction of the said urea containing cbannelized 2:1 clay minerals and said molten sulfur-heated air mixture to said granulating means 3 and sufficient time has elapsed to process the combined materials therein, sealing wax from a source not shown is fed via line 20 and means for control of flow 21 into granulating means 3 and generally onto the bed of rolling resulting particulate material therein. In like manner, usually after application of said sealing wax, conditioning dust from a source not shown is fed via line 22 and means for control of flow 23 onto the bed of tumbling discrete particulate material in said pan granulating means 3. Again, after sufficient time has elapsed to ensure complete coating and conditioning of the resulting tumbling particulate material processed in pan granulating means 3 it is withdrawn via line 24 a product of the instant invention. As described infra, in the conduct of various tests carried out for purposes of determining the critical features and operating parameters of the process comprising the instant invention, some of the finished sulfur-coated urea product withdrawn via line 24 was subjected to standard testing to determine the 7-day dissolution rate. The results of such testing revealed that only about two-thirds as much sulfur was required to achieve a dissolution rate of about 25 percent in 7 days as that required by prior-art processes. Alternatively, it was discovered that present commercially-practiced levels of sulfur coating could be added to pan granulating means 3 to produce a product having a much lower dissolution rate than is currently available from practice of present day state of the art technology. In the initial embodiment of the instant invention, the operation of pan granulating means 3 is conducted as a batch operation; although, of course, it might be practiced, if desired, on a continuous basis and using a drum-type granulator instead of a pan. The results achieved with the pan granulator batch tests as described in the examples infra may readily and easily be obtained by those skilled in the art through use of another type granulator, such as a drum, and continuous processing. Referring again to FIG. 1, said continuous process would involve feeding urea containing channelized 2:1 clay mineral granules continuously via line 1 and means for control of flow 2 into coating means 3. Molten sulfur, sealing wax, and conditioning dust would be fed continuously into respective compartments of coating means 3 or into separate coating means such as the devices described in '577 supra. Coated product would be withdrawn continuously.

DESCRIPTION OF THE PREFERRED EMBODIMENTS

In carrying out the object of our invention in one embodiment thereof, we have discovered that urea, when conditioned with channelized 2:1 clay minerals provides a substantially superior substrate for the application thereupon of coating of sulfur and to thereby achieve vastly enhanced characteristics relating to improved controlled dissolution rates.

In practicing the operation of the instant invention in one form thereof, granular urea containing channelized 2:1 clay minerals of particle size −6+9 mesh Tyler, prepared by any suitable method, including those taught by Blouin supra, is charged batchwise into any suitable processing means, such as for example, a pan-granulator coating device which pan granulator preferably may be heated by application thereto of externally supplied heat energy. Molten sulfur is sprayed onto the tumbling bed through a pneumatic nozzle. When the sulfur application is completed, a wax-sealing mixture is poured onto the tumbling bed, then conditioning clay is dusted onto the tumbling bed. The resulting finished sulfur-coated urea is subjected to standard testing procedures to determine the 7-day dissolution rate. See '333, Shirley et al. supra for the details re such standard testing procedure.

The results of such testing reveal that only about two-thirds as much sulfur is required (i.e., about 10 percent as opposed to about 16 percent for that required by prior-art processes) in order to achieve a dissolution rate of 25 percent in 7 days. Alternatively, present commercially practiced levels of sulfur coating, i.e., about 16 percent by weight, can be added to produce a product having a much lower dissolution rate. It will be appreciated by those skilled in the art that particle sizes other than 31 6+9 mesh may be coated to obtain improved product of the instant invention and that coating of coarser substrate will require proportionately less sulfur while finer substrate will require more sulfur.

EXAMPLES

In order that those skilled in the art may better understand how the present invention can be practiced, the following examples are given by way of illustration only and not necessarily by way of limitation, since numerous variations thereof will occur and will undoubtedly be made by those skilled in the art without substantially departing from the true and intended scope of the instant invention herein taught and disclosed.

EXAMPLE I

In the pursuit of further information for the purpose of more clearly defining the parameters effecting the practice of the instant invention, the investigations herein were made to determine if indeed, that for a given dissolution rate urea made with channelized 2:1 clay minerals, from two different sources, require less total coating than urea made with formaldehyde.

In the tests comprising this example, the sulfur coating was performed in batch-type equipment, reference is hereby made to the general description of the sulfur coating procedure contained in U.S. Pat. No. 4,676,821, Gullett, et. al., Jun. 30, 1987 assigned to assignee of the present invention. For purposes of teaching, disclosing, and claiming the instant invention, the teachings, disclosures, and claims of said '821, supra, are herewith and hereby incorporated herein by reference thereto.

Coating weights, 7-day dissolution rates, percentages of formaldehyde or channelized 2:1 clay minerals, and percent nitrogen are listed in Table I below.

TABLE I

| Sample No. | Substrate, wt % HCHO | Substrate, wt % clay | Sealed total coating wt % | % N | 7-day dissolution rate, % |
|---|---|---|---|---|---|
| 1 | 0 | 0.2[a] | 19.6 | 36.6 | 16.6 |
| 2 | 0 | 0.09[a] | 18.6 | 37.0 | 13.8 |
| 3 | 0 | 0.2[b] | 18.6 | 37.0 | 5.9 |
| 4 | 0 | 0.3[b] | 20.0 | 36.4 | 7.3 |
| 5a | 0 | 0.3[b] | 17.5 | 37.5 | 9.6 |
| 5 | 0.39 | 0 | 19.7 | 36.5 | 28.9 |
| 6 | 0.39 | 0 | 21.1 | 35.9 | 25.6 |

[a]Clay source 1.
[b]Clay source 2.

Referring now to the results illustrated in Table I supra, it will be appreciated that the dissolution rate of urea made with formaldehyde is in the range that is expected with a coating weight of 20 to 21 percent. The dissolution rates of the products made with channelized 2:1 clay minerals were significantly lower than was expected with the same coating weight. The dissolution rate results indicate that urea made with channelized 2:1 clay minerals requires significantly less total coating than urea made with formaldehyde.

EXAMPLE II

In the conduct of this example 11 tests were made using −6+9 mesh white urea (containing formaldehyde) coated at various levels of sulfur plus sealant and conditioner dust in order to demonstrate the effect of coating weight on the 7-day dissolution rate. The details of the sulfur coating procedure are as given in Example I supra, i.e., by incorporation of the reference procedures taught and disclosed in '821, supra. The results from these tests are shown in Table II below. Also, assembled in Table II below are the results obtained with −6+9 mesh urea containing two different channelized 2:1 clay minerals from two different sources at two different levels each, coated with sulfur, sealant, and dust. NOTE: Any references made herein to materials and/or apparatus which are identified by means of trademarks, trade names, etc., are included solely for the convenience of the reader and are not intended as or to be construed an endorsement of said materials and/or apparatus.

TABLE II

| Additive type, Wt % | Total coating, wt % | 7-day dissolution rate, % |
|---|---|---|
| Urea Plus Formaldehyde | | |
| HOCH .39 | 11.9 | 57.2 |
| HCOH .39 | 12.6 | 69.7 |
| HCOH .39 | 13.4 | 68.0 |
| HOCH .39 | 14.8 | 47.7 |
| HCOH .39 | 15.2 | 59.5 |
| HCOH .39 | 16.1 | 44.2 |
| HCOH .39 | 16.3 | 31.8 |
| HCOH .39 | 19.1 | 34.8 |
| HCOH .39 | 19.7 | 28.9 |
| HCOH .39 | 21.1 | 25.6 |
| HOCH .39 | 25.5 | 15.9 |
| Urea Plus Clay Source 1[a] | | |
| Test No. 11 - 0.2 | 12.5 | 68.5 |
| Test No. 10 - 0.2 | 12.8 | 44.9 |
| Test No. 9 - 0.2 | 13.6 | 64.2 |
| Test No. 8 - 0.2 | 13.7 | 56.9 |
| Test No. 7 - 0.2 | 14.3 | 61.5 |
| Test No. 6 - 0.2 | 15.4 | 26.0 |
| Test No. 5 - 0.2 | 15.9 | 36.4 |
| Test No. 4 - 0.2 | 16.8 | 23.0 |
| Test No. 3 - 0.2 | 17.7 | 34.1 |
| Test No. 2 - 0.2 | 18.6 | 13.8 |
| Test No. 1 - 0.2 | 19.6 | 16.6 |
| Urea Plus Clay Source 2[b] | | |
| Test No. 11 - 0.3 | 12.6 | 27.7 |
| Test No. 10 - 0.3 | 12.9 | 62.3 |
| Test No. 9 - 0.3 | 13.3 | 46.6 |
| Test No. 8 - 0.3 | 13.6 | 28.5 |
| Test No. 7 - 0.3 | 14.0 | 19.6 |
| Test No. 6 - 0.3 | 15.2 | 13.9 |
| Test No. 5 - 0.3 | 15.3 | 17.7 |
| Test No. 4 - 0.3 | 15.5 | 11.5 |
| Test No. 3 - 0.3 | 17.5 | 9.6 |
| Test No. 2 - 0.3 | 18.6 | 5.9 |
| Test No. 1 - 0.3 | 20.0 | 7.3 |

[a]Oil-Dri ® 134–115a, an experimental attapulgite gelling and suspending clay, particle size is >70 percent - 325 mesh. Oil-Dri Corporation of America, Chicago, Illinois.
[b]Min-U-Gel ® 400 clay is an attapulgite gelling and suspending clay, particle size >95 percent - 400 mesh. Floridin Company, Quincy, Florida.

Figure 2:
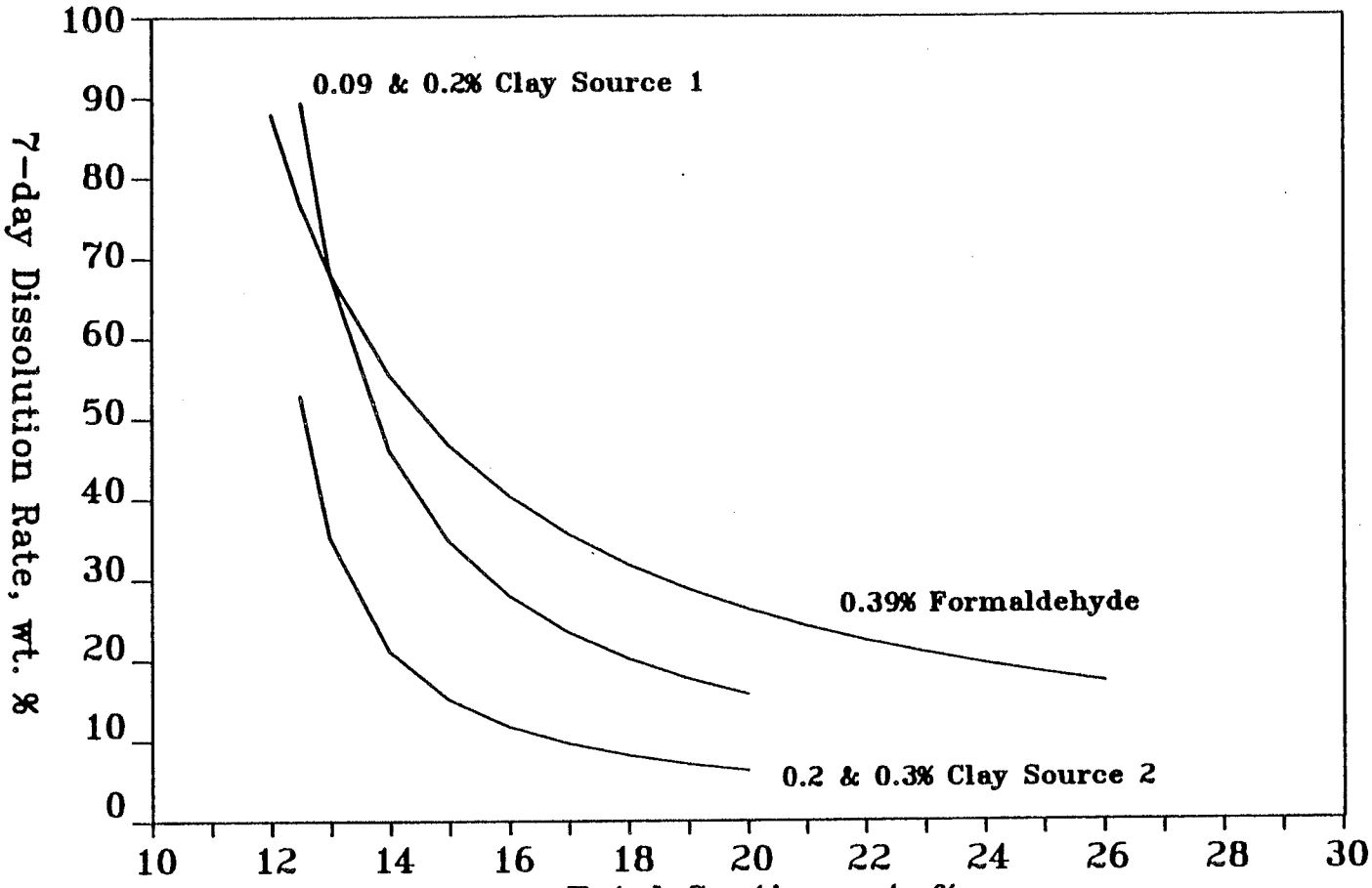
FIG. 2 graphically illustrates, by means of using a comparison of urea containing formaldehyde with urea containing channelized 2:1 clay minerals, that sulfur-coated urea containing channelized 2:1 clay minerals requires substantially smaller amounts of total coating to achieve the desired same 7-day dissolution rate than does urea conditioned with formaldehyde.

Referring now more specifically to FIG. 2 supra, and using the data in Table II supra, a comparison of urea containing formaldehyde with urea containing channelized 2:1 clay minerals is graphically illustrated. It may be appreciated by those skilled in this art that the depictions in FIG. 2 clearly illustrate that sulfur-coated urea containing channelized 2:1 clay minerals require less total coating weight to achieve the same 7-day dissolution rate than does urea conditioned with formaldehyde. By way of explanation, the curves in FIG. 2 were developed by computer analysis of the data in Table II supra, and are based on equations which best fit the data. These equations are:

For White Urea:

$$Y = \frac{300}{X - 8.6}$$

The correlation constant for this relationship is 0.90.

For Urea Containing Channelized 2:1 Clay Minerals:

Source 1 $Y = \frac{143}{X + 10.9}$ The correlation constant for this relationship is 0.75.

Source 2 $Y = \frac{52.9}{X - 11.5}$ The correlation constant for this relationship is 0.88.

In each equation X is the total weight of sulfur, sealant, and conditioner dust expressed as percent, by weight, of the product. In each equation Y is the 7-day dissolution rate expressed as percent of the urea substrate.

INVENTION PARAMETERS

After sifting and winnowing through the data supra, as well as other results and operations of our new, novel, and improved technique, including methods and means of the effecting thereof, the operating variables, including the acceptable and preferred conditions for carrying out our invention are summarized below.

| | Operating limits | Preferred limits | Most preferred limits |
|---|---|---|---|
| Type of Hardening Agent Channelized 2:1 clay minerals | 0.03–4.0 | 0.05–1.0 | 0.08–0.3 |
| Weight Percent Added | | | |
| Sulfur, of coated product | 5–30 | 5–20 | 10–16 |
| Sealant, of coated product | 1–5 | 2–4 | 3 |
| Conditioning dust, of coated product | 1–4 | 1–3 | 2 |
| Operating Temperatures, °F. | | | |
| Molten sulfur temp. | 285–320 | 290–310 | 300 |
| Bed temp. in coating pan during sulfur addition | 150–180 | 150–175 | 160 |
| Sealant temp. | 230–275 | 240–260 | 250 |
| Bed temp. in coating pan during sealant addition | 150–185 | 160–180 | 175 |
| Bed temp. in coating pan during dust addition | 80–120 | 90–110 | 100 |
| Sealant Composition | | | |
| Wt % Shellflex ® 790 brightstock oil | 20–80 | 60–80 | 70 |
| Wt % AC-6 ® polyethylene | 80–20 | 50–20 | 30 |
| Attained Objective Aqueous media dissolution rate, % in 7 days | 5–25 | 10–20 | 10 |

While we have shown and described particular embodiments of our invention, modification and variations will occur to those skilled in the art. We wish to be understood therefore that the appended claims are intended to cover such modification and variations which are within the true scope and spirit of our invention.

What we claim as new and desire to secure by Letters Patent of the United States is:

1. An improved product of substantially enhanced relatively low aqueous media dissolution rate and/or relatively high impact resistance resulting from the coating of a substrate with from about 5 percent to about 30 percent by weight based on the weight of coated product of sulfur, said substrate consisting essentially of a substantially homogeneous admixture of urea and a channelized 2:1 clay mineral, the quantity of said mineral ranging from about 0.03 percent to about 4 percent by weight of said admixture.

2. The improved product of claim 1 wherein said mineral ranges from about 0.05 percent to about 1.0 percent by weight of said admixture.

3. The improved product of claim 2 wherein said mineral ranges from about 0.08 percent to about 0.3 percent by weight of said admixture.

4. The improved product of claim 2 wherein said sulfur coating ranges from about 5 percent to about 20 percent by weight based upon the weight of coated product.

5. The improved product of claim 3 wherein said sulfur coating ranges from about 10 percent to about 16 percent by weight based upon the weight of coated product.

6. The improved product of claim 1 wherein said channelized 2:1 clay mineral is selected from the group consisting of attapulgite, sepiolite, and mixtures thereof.

7. The improved product of claim 4 wherein said channelized 2:1 clay mineral is selected from the group consisting of attapulgite, sepiolite and mixtures thereof.

8. The improved product of claim 5 wherein said channelized 2:1 clay mineral is selected from the group consisting of attapulgite, sepiolite, and mixtures thereof.

9. The improved product of claim 6 wherein said substantially enhanced relatively low aqueous media dissolution rate ranges from about 5 percent to about 25 percent in 7 days.

10. The improved product of claim 7 wherein said substantially enhanced relatively low aqueous media dissolution rate ranges from about 10 percent to 20 percent in 7 days.

11. The improved product in claim 8 wherein said substantially enhanced relatively low aqueous media dissolution rate is about 10 percent in 7 days.

12. An improved method for imparting to sulfur-coated particulate urea fertilizer the properties of substantially enhanced relatively low aqueous media dissolution rate and/or relatively high-impact resistance, which improved method comprises the steps of:

(1) mixing channelized 2:1 clay mineral into an essentially anhydrous molten melt of urea or a highly concentrated urea synthesis solution subsequently utilized to produce said melt until a homogeneous mixture thereof results;

(2) converting said melt resulting in step (1) into particulate form;

(3) subsequently coating the surfaces of the particulate urea resulting in step (2) supra with from about 5 to about 30 percent, by weight based on the weight of said resulting urea, or molten sulfur; and (4) converting said resulting molten sulfur-coated particulate urea, resulting in step (3) supra, into particulate form;

said improved method characterized by the fact that the resulting individual particles in step (2) supra contain from about 0.03 to about 4 percent by weight based on the weight of said urea of said clay and said improved method being further characterized by the fact that said weight percent sulfur coating and said substantially enhanced relatively low aqueous media dissolution rate are in direct and inversely proportional relationship to one another through the range of sulfur coating of from about 5 percent to about 30 percent and through the range of 7-day dissolution rate of from about 5 percent to about 25 percent.

13. The improved method of claim 12 wherein the said mount of channelized 2:1 clay mineral admixed with said anhydrous molten melt or said synthesis solution utilized for the production thereof is utilized in amounts ranging from about 0.05 percent to about 1.0 percent by weight of said clay mineral in the particulate urea resulting in step (2) thereof, wherein said sulfur coating resulting in the product therefrom ranges from about 5 percent to about 20 percent, and wherein said substantially enhanced relatively low aqueous media 7-day dissolution rate ranges from about 10 percent to about 20 percent.

14. The improved method of claim 13, wherein the amount of channelized 2:1 clay mineral admixed with said anhydrous molten melt, and said synthesis solution utilized for the production thereof is utilized in amount ranging from about 0.08 percent to about 0.3 percent by weight of said mineral in the particulate urea resulting in step (2) thereof, wherein said sulfur coating resulting in the product therefrom ranges from about 10 percent to about 16 percent, and wherein said substantially enhanced relatively low aqueous media 7-day dissolution rate is about 10 percent.

15. The improved method of claim 12 wherein said channelized 2:1 clay mineral is selected from the group consisting of attapulgite, sepiolite, and mixtures thereof.

16. The improved method of claim 13 wherein said channelized 2:1 clay mineral is selected from the group consisting of attapulgite, sepiolite, and mixtures thereof.

17. The improved method of claim 14 wherein said said channelized 2:1 clay mineral is selected from the group consisting of attapulgite, sepiolite, and mixtures thereof.

18. The improved product of claim 1 resulting from the coating of said substrate sulfur coating with a sealant comprising polyethylene, brightstock oil, and mixtures thereof and further resulting from coating the resulting sealed sulfur coating with conditioner dust.

19. The improved method of claim 12 wherein a sealant comprising polyethylene and brightstock oil, and mixtures thereof is applied to said sulfur coating and the resulting sealed sulfur coating is subsequently coated with conditioner dust.

* * * * *